United States Patent
Vogt et al.

(10) Patent No.: US 10,343,739 B2
(45) Date of Patent: Jul. 9, 2019

(54) DRINKING BOTTLE CAGE AND DRINKING BOTTLE

(71) Applicant: Canyon Bicycles GmbH, Koblenz (DE)

(72) Inventors: Stephan Vogt, Koblenz (DE); Sebastian Hahn, Werdohl (DE)

(73) Assignee: Canyon Bicycles GmbH, Koblenz (DE)

( * ) Notice: Subject to any disclaimer, the term of this patent is extended or adjusted under 35 U.S.C. 154(b) by 0 days.

(21) Appl. No.: 15/602,844

(22) Filed: May 23, 2017

(65) Prior Publication Data
US 2017/0341694 A1 Nov. 30, 2017

(30) Foreign Application Priority Data
May 31, 2016 (DE) .......... 10 2016 209 466

(51) Int. Cl.
B62J 11/00 (2006.01)
A45F 3/16 (2006.01)

(52) U.S. Cl.
CPC .......... B62J 11/00 (2013.01); A45F 3/16 (2013.01)

(58) Field of Classification Search
CPC .................... B62J 11/00; A45F 3/16
USPC ................ 224/414, 926; D12/411
See application file for complete search history.

(56) References Cited

U.S. PATENT DOCUMENTS

| | | | |
|---|---|---|---|
| 3,107,028 A * | 10/1963 | De Robertis | A47G 23/0216 215/395 |
| D264,954 S | 6/1982 | Blackburn | |
| 4,928,876 A * | 5/1990 | Marshall | A47G 19/2261 220/705 |
| 5,624,064 A * | 4/1997 | McGee, Jr. | B62J 11/00 215/373 |
| 5,722,574 A | 3/1998 | Pratt | |
| D502,366 S * | 3/2005 | Strepkoff | 220/741 |
| D682,187 S * | 5/2013 | Cobb | D12/411 |
| 2010/0059638 A1* | 3/2010 | Taiga | B62J 11/00 248/124.1 |
| 2010/0237118 A1 | 9/2010 | Altshuler | |
| 2010/0264184 A1* | 10/2010 | Retief | B62J 11/00 224/427 |
| 2011/0147423 A1* | 6/2011 | Serpell | B62J 11/00 224/414 |
| 2011/0155750 A1* | 6/2011 | Bernstein | A45F 3/16 220/714 |

FOREIGN PATENT DOCUMENTS

| | | | | |
|---|---|---|---|---|
| CN | 202911857 U | 5/2013 | | |
| DE | 9215894 U1 | 2/1993 | | |
| DE | 10140690 A1 * | 3/2003 | | B60N 3/10 |
| EP | 0999120 A2 | 5/2000 | | |
| NL | 9101831 A | 5/1993 | | |

(Continued)

*Primary Examiner* — Scott T McNurlen
(74) *Attorney, Agent, or Firm* — The Webb Law Firm

(57) ABSTRACT

A drinking bottle cage includes a fastening member for fastening to a bicycle frame. The fastening member has connected therewith, in particular integrally formed with, a bottom holding member and a fixing member. The bottom holding member includes a projection in particular configured as a pin, said projection engaging with a recess provided at the bottom of the drinking bottle when the drinking bottle is fixed.

18 Claims, 3 Drawing Sheets

(56) References Cited

FOREIGN PATENT DOCUMENTS

| TW | 35300 U | * | 9/2009 |
|---|---|---|---|
| TW | M365300 U1 | | 9/2009 |
| TW | M398505 U1 | | 2/2011 |
| TW | M436016 U1 | | 8/2012 |
| WO | 9633903 A1 | | 10/1996 |

* cited by examiner

DRINKING BOTTLE CAGE AND DRINKING BOTTLE

CROSS-REFERENCE TO RELATED APPLICATION

This application claims priority to German Patent Application No. 10 2016 209 466.1 filed May 31, 2016, the disclosure of which is hereby incorporated in its entirety by reference.

BACKGROUND OF THE INVENTION

Field of the Invention

The present invention relates to a drinking bottle cage, in particular for fastening to a bicycle frame. Further, the present invention relates to a drinking bottle, in particular a bicycle drinking bottle.

Description of Related Art

Drinking bottle cages mostly made of metal are known for fastening drinking bottles in particular to a bicycle frame. These drinking bottle cages comprise a metal wire which is appropriately bent for clampingly holding a drinking bottle. Such drinking bottle cages comprise a fastening member for fastening the drinking bottle to the bicycle frame, the bicycle seat or the like. For the purpose of fastening to the bicycle frame it is common practice to attach the fastening member to the seat tube or the down tube of the bicycle frame with the aid of two screws at a standardized distance of usually 64 mm. The drinking bottle is placed into the drinking bottle cage from the front or from above. Such drinking bottle cages are meanwhile widely used and are described in U.S. D 264,954, for example.

When the bottle is placed into or removed from the drinking bottle cage both the bottle which is usually made from plastic material and the drinking bottle cage are plastically deformed. Here, the bottle is removed essentially in the longitudinal direction of the drinking bottle cage in parallel to the down tube or the seat tube, for example. Since the designs of bicycle frames have changed over the past years such that the designs have become more compact and dampers have been additionally arranged in the triangle formed by the top tube, the down tube and the seat tube of mountain bikes or trekking bikes, for example, it is often difficult to remove the drinking bottle in the longitudinal direction.

Therefore, in EP 0 999 120 a drinking bottle cage is described which allows for removal in a direction other than the longitudinal direction. Here, removal from a drinking bottle cage arranged at the lower tube is effected not in the longitudinal direction of the down tube but towards the top or the side. Further, the drinking bottle cage described in EP 0 999 120 thus has the drawback that the installation space for the bottle and the drinking bottle cage is relatively large, in particular in the case of full suspension mountain or trekking bikes where in the triangle formed by the tubes appropriate spring elements are arranged. For example, this is attributable to the fact that modern mountain bikes frequently comprise a top tube arranged at a relatively deep location to ensure a small standover height.

SUMMARY OF THE INVENTION

It is an object of the present invention to provide a drinking bottle cage which requires little space and ensures reliable and easy removal and holding of drinking bottles. Further, it is an object of the present invention to provide a suitable drinking bottle.

The drinking bottle cage according to the present invention, which is in particular suitable for being fastened to the bicycle frame but also to the seat, the seat tube or the handlebar, comprises a fastening member. With the aid of the fastening member fastening to the bicycle frame or the like is performed. Here, the fastening member may comprise two openings for fastening to the down tube or the seat tube of the bicycle frame in order to fix the drinking bottle cage at the down tube or the seat tube via the threaded bores provided for this purpose. The fastening member is appropriately configured, e.g. as a clamp, for the purpose of fixing in the rear area of the seat, the seat tube or the handlebar, for example. Together with the fastening member a bottom holding member for holding a bottom of a bottle or another member provided in particular in the lower area of the bottle is arranged. In particular, the bottom holding member is integrally formed with the fastening member. Further, the drinking bottle cage comprises a fixing member connected to the fastening member for holding the drinking bottle. Preferably, the fixing member is also integrally formed with the fastening member, wherein it is particularly preferred that the entire drinking bottle cage is made from plastic material. According to the invention, the bottom holding member comprises a projection. When the drinking bottle is fixed, the projection engages with a recess of the drinking bottle, wherein this recess is preferably located at the bottom of the bottle. Likewise, the bottom holding member may comprise a recess which engages with a projection provided at the drinking bottle, wherein the projection is preferably arranged at the bottom of the bottle.

In a preferred embodiment of the present invention, the projection is configured as a pin or a rod. Further, it is particularly preferred that the projection comprises a spherical end portion. This is the free end of the projection which extends into the free end of a drinking bottle. In particular in the end portion the projection is thus configured similar to a spherical head or a hemisphere. In a particularly preferred aspect this offers the advantage that in the case of a complementary recess automatic centering is achieved in particular at the bottom of the bottle. The recess at the bottom of the bottle is hence also of spherical configuration, in particular corresponding to a bottom hemisphere of the like. The dimensions, in particular the diameter of the recess, are preferably considerably larger than those of the projection such that the projection is automatically centered or slides into the recess. Thus simple handling is ensured. Particularly preferred is a configuration where the projection of the drinking bottle cage and in particular the recess provided at the bottom of the bottle are designed such that, when the drinking bottle is fixed, the projection is coaxial with the center axis or longitudinal axis of the drinking bottle.

Likewise, it is possible to configure the projection as a hook. When the drinking bottle is fixed, the hook-shaped projection also engages with a recess of the drinking bottle which, in a preferred embodiment of the present invention, is provided at the bottom of the drinking bottle. In particular, the drinking bottle comprises a circumferential edge behind which the hook-shaped projection grips. Here, it is particularly preferred that the edge is arranged at the bottom of the drinking bottle and extends in the longitudinal direction of the drinking bottle, i.e. downwards with respect to the bottom of the drinking bottle. The particularly circumferential edge again allows for easy insertion of the hook-shaped projection into the recess defined by the edge such that in this embodiment, too, simple handling is ensured.

In addition to the projection provided at the bottom member which cooperates with a recess of the drinking bottle, or a recess provided at the bottom member of the drinking bottle cage member which cooperates with a projection of the drinking bottle, the drinking bottle cage comprises a fixing member. This member serves for fixing the drinking bottle such that the latter is reliably held even when the bicycle rides on rough terrain. Here, the fixing member ensures a frictional engagement or positive locking of the drinking bottle. For example, the fixing member may comprise a strip fastener, a snap connector or a latching connector. Further, a magnetic catch may be provided as a fixing member.

It is particularly preferred that the fixing member comprises at least one latching member. This allows for simple releasing or removing of the bottle from the drinking bottle cage.

The fixing member, which in a preferred embodiment of the present invention comprises at least one latching member, preferably cooperates with a bottleneck. Here, preferably, the fixing member partially, in particular by more than 180°, encompasses the bottleneck to ensure reliable holding of the drinking bottle. Providing the fixing member in the area of the bottleneck further offers the advantage that the drinking bottle is prevented from being displaced or slipping in the longitudinal direction of the drinking bottle cage. Further, the projection is thus prevented from slipping out of a recess in the bottom of the bottle.

In a particularly preferred embodiment of the present invention, the fixing member comprises two latching arms in particular located opposite each other. At least one of the latching arms, in particular both latching arms, are of an elastic configuration. Preferably, at least one of the latching arms comprises a partially annular portion. In the fixed state the drinking bottle may be arranged at this annular portion.

In addition, it is possible to provide an unlocking member. The unlocking member serves for unlocking and locking the drinking bottle. Thus additional fixing of the drinking bottle can be ensured. For instance, appropriate locking can additionally ensure that the drinking bottle does not detach itself from the drinking bottle cage in particularly rough terrain. Here, the unlocking and locking member is preferably configured such that it need only be used at option. The locking and unlocking member may be provided as a pivotable or displaceable lock bar, for example. This lock bar is in particular arranged in the area of the fixing member and particularly preferably in the area of the latching arms located opposite each other. The lock bar may be provided with latching members or the like such that the unlocking and locking member is latchingly held preferably in both end positions.

The configuration according to the present invention of the drinking bottle cage allows for fixing the drinking bottle in the cage such that the projection of the bottom holding member of the drinking bottle cage is inserted into the recess in particular provided at the bottom of the drinking bottle, wherein in a particularly preferred embodiment of the present invention automatic centering is performed. Then the drinking bottle need only be tilted to the side for being connected with the fixing member which, in a preferred embodiment, is a latching member. The space required by the drinking bottle cage, in particular including the space needed for handling, is considerably smaller as compared with conventional systems since the drinking bottle need not be removed in the longitudinal direction of the drinking bottle cage. Removal vertically upwards with respect to the down tube as required in the case of the drinking bottle cage according to EP 0 999 120, for example, is not absolutely necessary. In the case of the drinking bottle cage according to the present invention removal can be performed in the lateral direction.

In a preferred embodiment of the present invention, the drinking bottle cage described above, which is preferably suitable for receiving a drinking bottle, is configured such that the fastening member, the bottom holding member and the fixing member are arranged in the same plane. When the drinking bottle is fixed, the center axis or longitudinal axis of the drinking bottle preferably lies in the same plane if the drinking bottle is a rotational symmetric drinking bottle.

In a particularly preferred aspect of the drinking bottle cage according to the present invention, two bottom holding members and two fixing members are provided such that a drinking bottle cage receives two drinking bottles. In the fixed state, these bottles are preferably arranged next to each other. When the drinking bottle cage is fastened to a down tube, the two drinking bottles are not completely arranged above the down tube but next to each other. In this example, it is possible to reduce the required installation space vertical to the down tube. Conventional drinking bottles have a diameter of approximately 74 mm. When two drinking bottles arranged next to each other are provided, it is possible to provide drinking bottles with smaller diameters. Although the arrangement of two drinking bottles next to each other results in a lager width, even at an overall width of approximately 120 mm it is ensured that the drinking bottles do not interfere with the foot pedal or the area where the shanks of the bicycle rider move.

In this preferred embodiment of the drinking bottle cage for two drinking bottles it is preferred that the two bottom holding members as well as the two fixing members are advantageously configured as described above.

In a preferred embodiment of the present invention, a bottom holding member, an associated fixing member and the common fastening member define a first plane. The second bottom fastening member as well as the associated fixing member and the common fastening member preferably define a second plane. Preferably, these two planes form an angle of 90-160° with respect to each other. If the drinking bottles are rotational symmetric drinking bottles, it is further preferred that the longitudinal axes of the two drinking bottles are respectively arranged in one of the two planes.

The drinking bottle cage for two drinking bottles is preferably configured such that the two drinking bottles are arranged essentially in parallel to each other in the cage. A distance between the two drinking bottles in their longitudinal direction thus remains substantially constant.

In addition, the drinking bottle cage for two drinking bottles offers the advantage that the cage, due to its configuration, can in particular be arranged at the down tube or the seat tube of a bicycle frame. This is not possible in the case of conventional drinking bottle cages for two drinking bottles. They are fastened to the seat or the seat post supporting the seat and behind the seat as seen in the direction of travel, as is known from US 2010/0237118.

In a preferred embodiment of the drinking bottle cage, in particular the drinking bottle cage for two bottles, the bottom holding member and the fixing member, in particular the two bottom holding members and the two fixing members, are connected with each other via a connecting web. The connecting web is preferably arranged in parallel to the fastening member. In the case of such a drinking bottle cage for two drinking bottles it is preferred that the connecting web is arranged between the two fixed drinking bottles. A connecting web can improve the stability of the drinking bottle cage. In addition, it is possible to fasten further additional members to the connecting web. These are tools, a tool bag, a pump or the like, for example. For this purpose it is preferred to provide holding members, such as clips or the like, at the connecting web. The clips may be connected with a rubber band which holds a pump, for example.

Further, the present invention relates to a drinking bottle which is in particular suitable for the drinking bottle cage described above. The drinking bottle comprises a receiving container having a bottom member and a top member. The bottom member comprises a recess for receiving a projection of the drinking bottle cage. The recess is in particular configured as a depression, wherein it is particularly preferred that in the case of in particular a rotational symmetric drinking bottle the turning point of the depression is arranged on the rotation axis or longitudinal axis of the bottle. This considerably facilitates the handling. In addition, the recess is preferably at least partially of spherical configuration. In particular in the case of a rotational symmetric recess it is preferred that the central middle area is of spherical configuration. Thus when the drinking bottle is inserted into the drinking bottle cage, it is always automatically centered.

The bottom member is in particular integrally formed with the receiving container. The top member is preferably detachably connected with the receiving container via a screw connection, a clamping connection or the like such that the receiving container can be easily cleaned and filled.

The top member comprises in particular a bottleneck. The bottleneck has connected therewith a mouthpiece which is adapted to be opened and closed via a member displaceable in particular in the longitudinal direction. The bottleneck, which in particular forms part of the top member, serves in particular for connection with the fixing member of the bottle cage, in particular the flexible latching arms.

In an alternative configuration of the drinking bottle, the recess provided at the bottom member is configured such that is surrounded by an in particular completely surrounding edge. This embodiment is preferably suitable for connection with a hook-shaped projection of the drinking bottle cage.

In addition, the present invention relates to a drinking bottle system having a drinking bottle cage as described above and at least one drinking bottle as described above.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which.

DETAILED DESCRIPTION OF THE INVENTION

Figure 1:
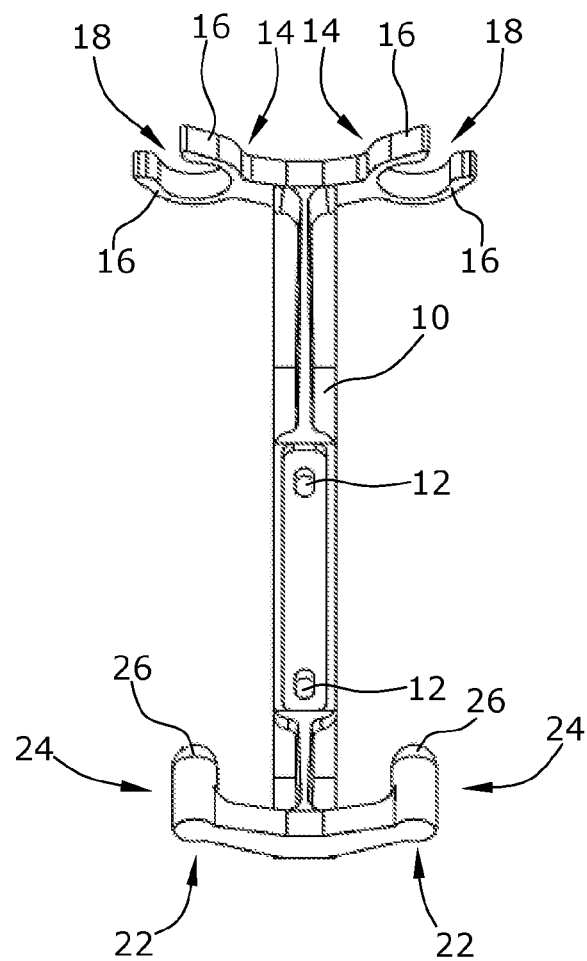
FIG. 1 shows a schematic perspective view of a drinking bottle cage for two drinking bottles.

A preferred embodiment of the drinking bottle cage for two drinking bottles (FIGS. 1 and 2) comprises a fastening member 10. This member is of elongate and web-type configuration. The fastening member 10 comprises two openings 12. These openings serve for fixing to a down tube to a seat tube of a bicycle frame by means of screws, for example. Here, the two fastening openings 12 are arranged at the standardized distance of in particular 64 mm.

The fastening member 10, which is in particular integrally formed of plastic material, has connected therewith two fixing members 14. In the illustrated exemplary embodiment, the fixing members 14 respectively comprise two elastic latching arms 16. The two latching arms 16 define an insertion opening 18. Through the insertion opening 18 a bottleneck 20 (FIG. 2) is inserted for fixing purposes. When the bottleneck 20 is inserted, the two latching arms 16 are pressed apart and encompass the bottleneck 20 thus fixing the latter.

Opposite the fixing members 14 two bottom holding members 22 are connected, in particularly integrally formed, with the fastening member. In the illustrated exemplary embodiment, the bottom holding members 22 respectively comprise a pin-shaped projection 24. The projections 24 point towards the fixing members 14. At their free ends the two pin-shaped projections 24 comprise a spherical, in particular hemispherical, free end 26.

The center of the fixing members 14 as well as the center of the bottom holding members 22 together with the fastening member 10 form two planes or are arranged in two planes. These planes respectively pass through a longitudinal axis of the fastening member which extends through the two fastening openings 12 in the illustrated exemplary embodiment. In the illustrated exemplary embodiment, these two planes form an angle of approximately 150-160°.

The two cycling bottles 28 (FIG. 2) are of identical configuration. The bottleneck 20 forms part of a top member 32 connected with a receiving container 30 by means of screws, for example. Opposite the top member 32 a bottom member 34 in particular integrally connected with the receiving member 30 is provided. The bottom member 34 comprises a middle central opening 36. In the illustrated exemplary embodiment, the drinking bottle 28 is of rotationally symmetric configuration. The opening 36 in particular configured as a depression comprises a spherical space at least in the central area. Thus the drinking bottle 28 is automatically centered on the projection 24 when the former is inserted into the drinking bottle cage.

For removing a drinking bottle 28 from the cage the former is tilted such that the bottleneck 20 can be removed from the opening 18 between the two latching arms 16. Here, lateral tilting is possible such that the space required is extremely small. Subsequently, the drinking bottle 28 can be lifted from the pin-shaped projection 24. Vice versa, the drinking bottle is first placed upon the pin-shaped projection 24 for the purpose of fixing the drinking bottle 28, wherein the pin-shaped projection 24 is inserted into the depression 36. Subsequently, the bottle is tilted inwards such that the bottleneck 20 is moved through the opening 18 of the respective fixing member 14 and is then latchingly held by the latching arms 16.

Figure 3:
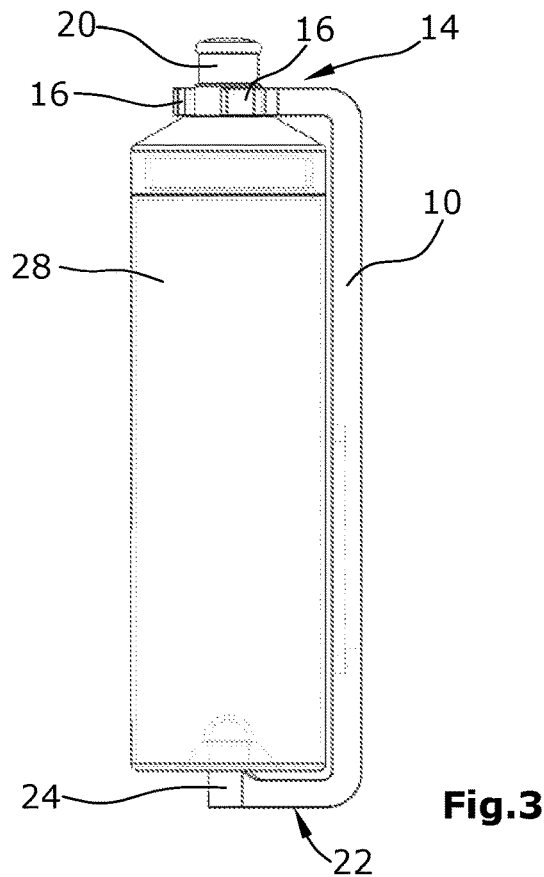
FIG. 3 shows a schematic side view of a drinking bottle cage with a drinking bottle.

Instead of a drinking bottle cage for two drinking bottles 28 it is also possible to configure the former for only one drinking bottle (FIG. 3). Here, the members of the drinking bottle cage are essentially identical with the members described above with reference to FIG. 1. The corresponding components are thus designated by the same reference numerals.

The fastening member 10 is connected with a fixing member 14 which comprises two latching arms 16 located opposite each other. The latching arms surround the bottleneck when the drinking bottle 28 is fixed. Opposite the fixing member 14 the bottom member 22 is arranged. The latter comprises a projection 24 which extends into the depression 36 of the drinking bottle.

In this embodiment, the bottom holding member 22 of the fastening member 10 and the fixing member 14 are arranged in the same plane.

Figure 2:
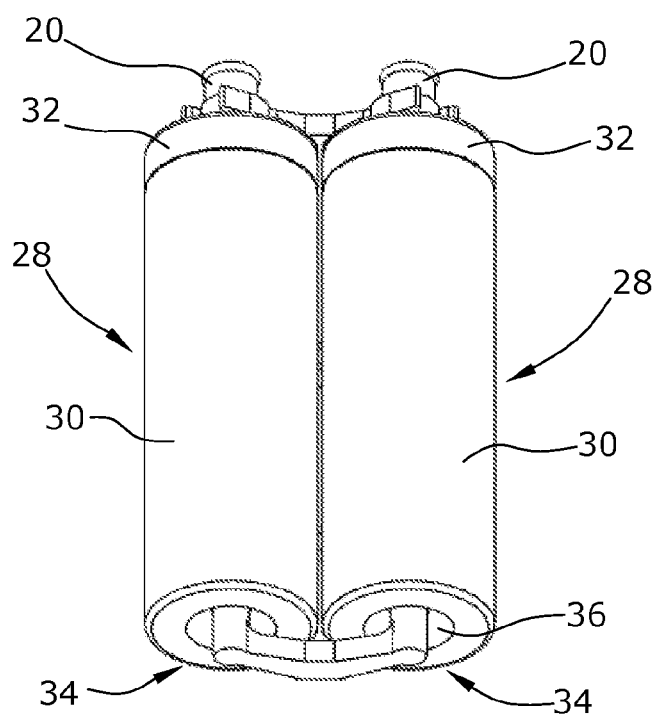
FIG. 2 shows the drinking bottle cage illustrated in FIG. 1 together with drinking bottles.
Figure 4:
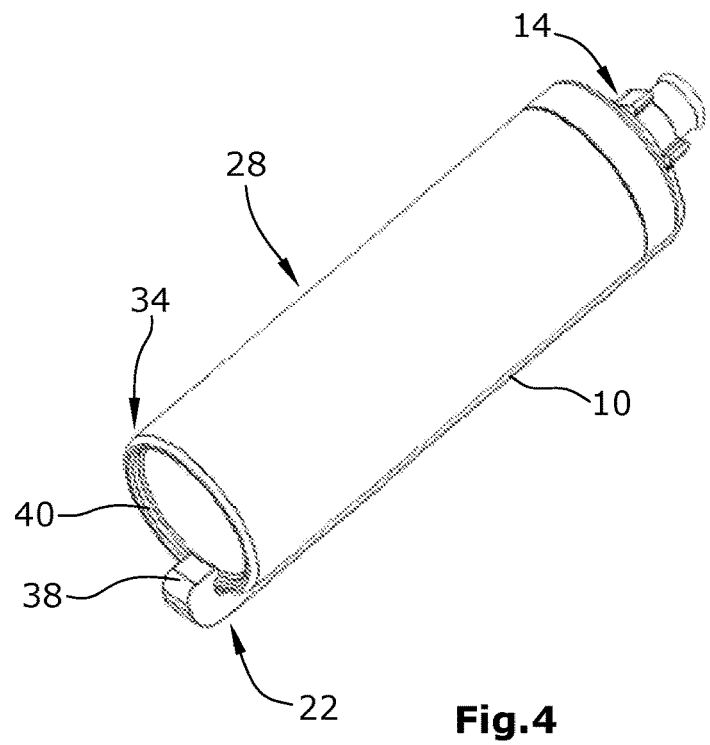
FIG. 4 shows another preferred embodiment of a drinking bottle cage with a drinking bottle.

According to another preferred embodiment shown in FIG. 4 with only one drinking bottle, the bottom member 34 is of a somewhat different configuration. Instead of a pin-shaped projection 24 centrally or concentrically engaging with a depression of the drinking bottle, as illustrated in FIGS. 1-3, the projection is configured as a hook 38. Accordingly, a bottom member 34 of the drinking bottle 28 is provided with a circumferential edge 40. The hook-shaped projection 38 grips behind the circumferential edge 40.

Otherwise, the drinking bottle cage illustrated in FIG. 4 also comprises a corresponding fastening member 10 which includes a fixing member 14 on the side opposite the hook-shaped projection 38. The bottle 28, too, is of identical configuration except for the bottom area which is of a slightly different configuration.

In another preferred embodiment of a drinking bottle cage for two drinking bottles (FIG. 5) similar and identical components are designated by the same reference numerals.

In the illustrated exemplary embodiment, this drinking bottle cage, too, comprises a fastening member 10 which includes a plurality of longitudinal holes 42 for receiving screws for the purpose of fastening to a down tube or the like, for example. The fastening member 10 has connected therewith two fixing members 14. These fixing members also comprise latching arms 44 which are, however, of a somewhat different configuration as compared with the latching arms 16. The two latching arms 44 however define an opening 18 for receiving a bottleneck.

A latching arm 44 is respectively connected with the fastening member 10 via a connecting web 46. The opposite latching arm 44 is connected with a connecting web 50 via a web 48 located opposite the web 46.

On the side opposite the fixing members 14 bottom holding members 22 are provided which are also connected with the fastening member 10. In addition, the bottom holding members 22 comprise webs 52, 54 which are connected with the connecting web 50. The connecting web 50 is arranged opposite the fastening member 10.

Figure 5:
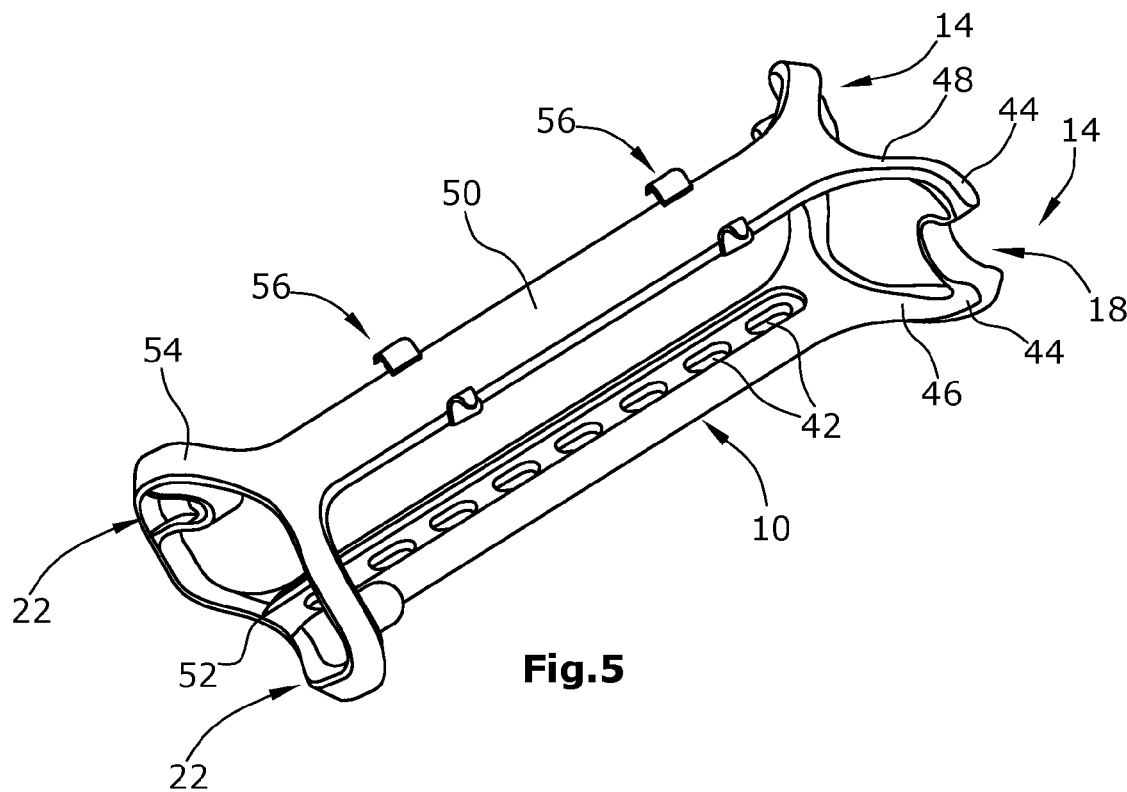
FIG. 5 shows a schematic perspective view of another embodiment of a drinking bottle cage for two drinking bottles.
Figure 6:
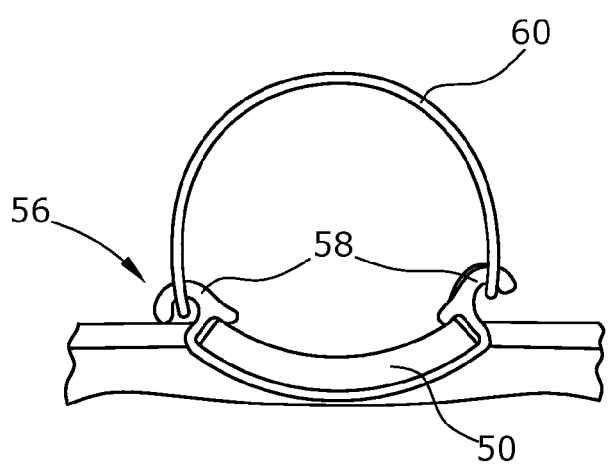
FIG. 6 shows a schematic sectional view of a connecting web of the drinking bottle cage illustrated in FIG. 5.

The two drinking bottles adapted to be received in the drinking bottle cage illustrated in FIG. 5 are fixed as described above. In the fixed state the connecting web 50 is arranged between the two drinking bottles. With the aid of the connecting web a more rigid drinking bottle cage can be realized. According to a sectional view of the connecting web 50 illustrated in FIG. 6, the latter can be connected with holding members 56 in particular configured as clips. These holding members may comprise hook-shaped projections 58 for connection with a rubber band 60. This allows for holding a bicycle tire inflator, for example.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A drinking bottle cage, for fastening to a bicycle frame, comprising
   a fastening member for fastening to the bicycle frame,
   two bottom holding members connected with said fastening member for holding a first drinking bottle and a second drinking bottle,
   two fixing members connected with said fastening member for holding said first drinking bottle and said second drinking bottle, and
   a connecting web spaced apart from the fastening member by the bottom holding members and the fixing members,
   wherein said bottom holding members each comprise a projection which engages with a recess of said first drinking bottle or said second drinking bottle when said first drinking bottle or said second drinking bottle is fixed,
   wherein one of the two bottom holding members, the associated fixing member, and the fastening member are arranged in a first plane, and
   wherein the other of the two bottom holding members, the associated fixing member, and the fastening member are arranged in a second plane.

2. The drinking bottle cage according to claim 1, wherein each of the first or second drinking bottles is removable from the drinking bottle cage by laterally tilting the first or second drinking bottle to release the first or second drinking bottle from the associated fixing member.

3. The drinking bottle cage according to claim 1, wherein the projection is configured as a pin.

4. The drinking bottle cage according to claim 1, wherein the projection comprises a spherical end portion.

5. The drinking bottle cage according to claim 1, wherein the projection and the recess are configured such that the projection is coaxial to the longitudinal axis of each drinking bottle when each drinking bottle is fixed.

6. The drinking bottle cage according to claim 1, wherein the projection is configured as a hook.

7. The drinking bottle cage according to claim 1, wherein the fixing members fix the drinking bottles via one of frictional engagement and positive locking.

8. The drinking bottle cage according to claim 1, wherein each fixing member comprises latching members.

9. The drinking bottle cage according to claim 1, wherein each fixing member cooperates with a bottleneck.

10. The drinking bottle cage according to claim 9, wherein each fixing member comprises two latching arms located opposite each other.

11. The drinking bottle cage according to claim 1, wherein each fixing member partially surrounds the bottleneck.

12. The drinking bottle cage according to claim 11, wherein each fixing member surrounds the bottleneck by more than 180°.

13. The drinking bottle cage according to claim 1, further comprising a locking and unlocking member for unlocking the first and second drinking bottles.

14. The drinking bottle cage according to claim 1, wherein the two planes form an angle of 90-160°.

15. The drinking bottle cage according to claim 1, wherein the two fixed drinking bottles are arranged in parallel to each other.

16. The drinking bottle cage according to claim 1, wherein the connecting web is arranged in parallel to the fastening member.

17. The drinking bottle cage according to claim 1, wherein the connecting web is arranged between the drinking bottles.

18. The drinking bottle cage according to claim 1, wherein the connecting web comprises at least one holding member for fixing an additional member.

* * * * *